United States Patent [19]

Meyers

[11] Patent Number: 5,715,661
[45] Date of Patent: Feb. 10, 1998

[54] BOOT FOR HORSES

[76] Inventor: Carol Ann Meyers, P.O. Box 192, Usk, Wash. 99180

[21] Appl. No.: 787,026

[22] Filed: Jan. 28, 1997

[51] Int. Cl.⁶ .................................. B68C 5/00; A01L 3/00
[52] U.S. Cl. ........................................... 54/82; 168/18
[58] Field of Search .......................... 168/1, 3, 18; 54/82

[56] References Cited

U.S. PATENT DOCUMENTS

| | | | |
|---|---|---|---|
| 3,703,209 | 11/1972 | Glass | 168/18 |
| 3,732,929 | 5/1973 | Glass | 168/18 |
| 3,800,504 | 4/1974 | Gregory | 54/82 |
| 4,174,754 | 11/1979 | Glass | 168/18 |
| 5,148,872 | 9/1992 | Dallmer | 168/11 |
| 5,224,549 | 7/1993 | Lightner | 168/18 |
| 5,363,632 | 11/1994 | Armato | 54/82 |

*Primary Examiner*—Robert P. Swiatek
*Attorney, Agent, or Firm*—David L. Volk

[57] ABSTRACT

A first panel is adapted to cover a bottom of a horse's hoof. A second panel extends upwardly from the perimeter of the first panel and includes a front portion, two opposing side portions and a back portion. The front portion is adapted to cover a front of a horse's hoof; the side portions are each adapted to cover a side of a horse's hoof; and the back portion is adapted to cover a back of a horse's hoof. The second panel forms an opening positioned opposite the first panel for insertion of a horse's hoof there-through. The back portion includes two sides and a triangular foldable portion at each of the sides, the foldable portions each connected to one of the side portions. A plurality of strap loops are distributed circumferentially about the second panel near the opening. A strap is configured to be inserted through the loops, and includes a buckle for securing the strap about the second portion.

2 Claims, 2 Drawing Sheets

BOOT FOR HORSES

BACKGROUND OF THE INVENTION

1. Field of the Invention

The present invention relates to protective wear for a horse, particularly to a boot worn on a horse's hoof.

2. Description of the Related Art

Horse shoes and horse boots are well known articles in the prior art for protecting a horse's hooves from damage. Compared to horse shoes, horse boots have the advantage of covering more than just the bottom of the hoof, and can help to protect already damaged hooves while they heal.

Horse boots of the prior art have limited adjustability, insecure closures which tend to pop open during use, and metal protuberances inside of the boot which can do further damage to a horse's hoof. These horse boots can also be difficult to place on a hoof, and complicated in structure. The limited adjustability of these boots can cause a horse with a poorly fitted boot to walk on its toe, thereby stressing the leg.

SUMMARY OF THE INVENTION

The horse boot of the present invention includes a first panel adapted to cover a bottom of a horse's hoof. A second panel extends upwardly from the perimeter of the first panel and includes a front portion, two opposing side portions and a back portion. The front portion is adapted to cover a front of a horse's hoof; the side portions are each adapted to cover a side of a horse's hoof; and the back portion is adapted to cover a back of a horse's hoof. The second panel forms an opening positioned opposite the first panel for insertion of a horse's hoof there-through. The back portion includes two sides and a triangular foldable portion at each of the sides, the foldable portions each connected to one of the side portions. A plurality of strap loops are distributed circumferentially about the second panel near the opening. A strap is configured to be inserted through the loops, and includes a buckle for securing the strap about the second panel, thereby securing the boot to a horse's hoof.

Accordingly, several objects and advantages of the present invention are:

a. to provide a horse boot with a large degree of adjustability;

b. to provide a horse boot which is simple in structure;

c. to provide a horse boot which is easy to put on a hoof;

d. to provide a horse boot with a closure that doesn't inadvertently pop open; and e. to provide a horse boot devoid of damaging internal metal protuberances.

Still further objects and advantages will become apparent from the ensuing description and drawings.

DETAILED DESCRIPTION

Figure 1:
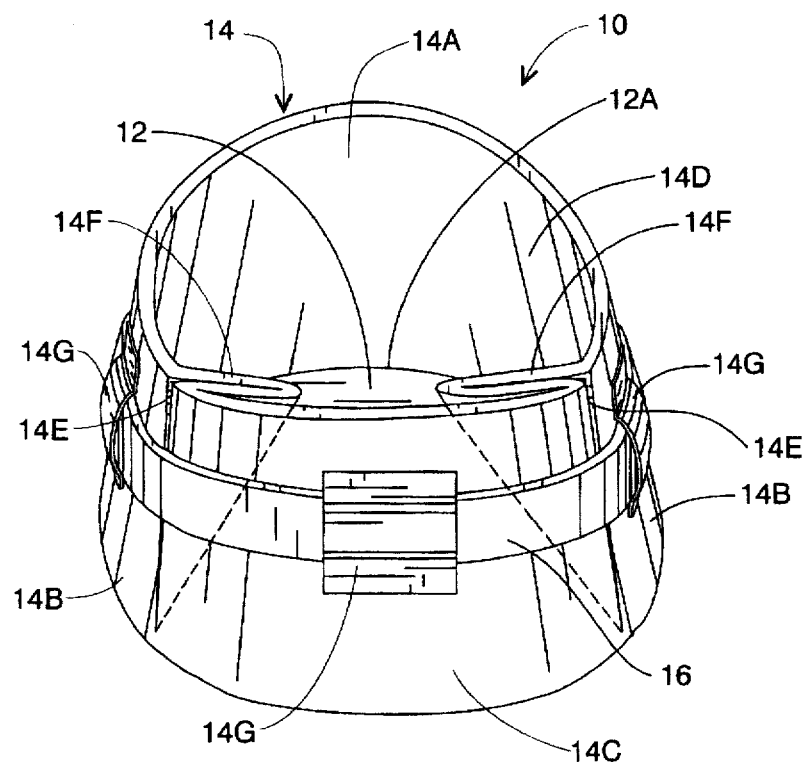
FIG. 1 is a rear perspective view of a horse boot.

FIG. 1 is a rear perspective view of a horse boot 10, including a substantially flat first panel 12, and a second panel 14 extending upwardly from a perimeter 12A of the first panel 12. The first panel 12 is adapted to cover a bottom of a horse's hoof (not shown in this figure) when the horse boot 10 is worn.

The second panel 14 includes a front portion 14A, two opposing side portions 14B, and a back portion 14C. The front portion 14A, the side portions 14B, and the back portion 14C are adapted to cover the front, sides and back respectively of a horse's hoof when the horse boot 10 is worn. The second panel 14 forms an opening 14D positioned opposite the first panel 12 for insertion of a horse's hoof there-through.

The back portion 14C has two sides 14E and a triangular foldable portion 14F at each of the sides 14E. The foldable portions 14F are each connected to one of the side portions 14B. A plurality of strap loops 14G are distributed circumferentially about the second panel 14 near the opening 14D. A strap 16 is inserted through the strap loops 14G.

Figure 2:
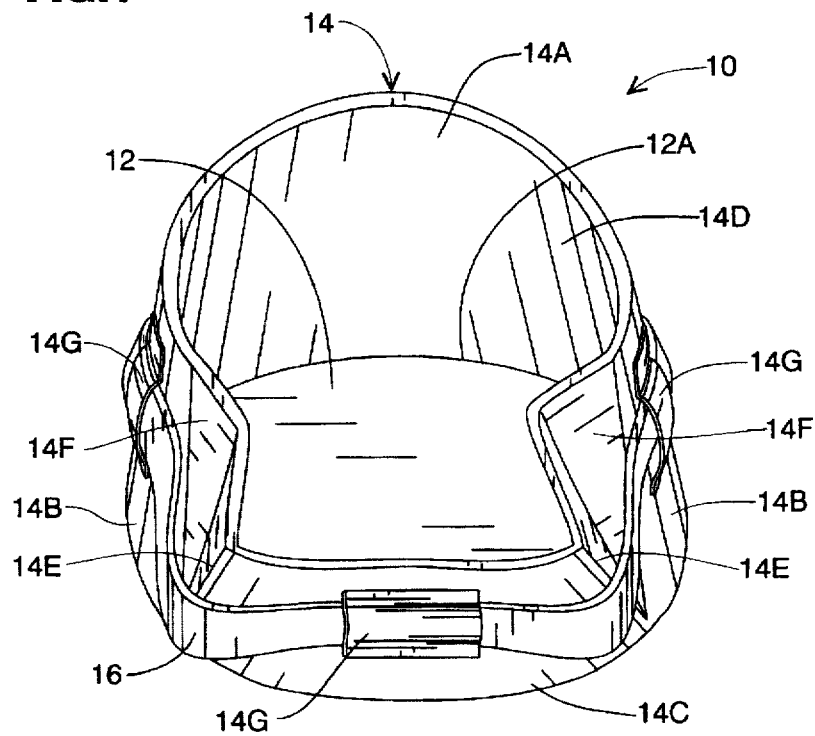
FIG. 2 is a rear perspective view of the horse boot ready to be placed on a horse's hoof.

FIG. 2 is a rear perspective view of the horse boot 10 ready to be placed on a horse's hoof (not shown). The strap 16 is loosened, and the back portion 14C is pulled outward to move the foldable portions 14F toward an unfolded position. This widens the opening 14D to permit a horse's hoof to be easily inserted there-through.

Figure 3:
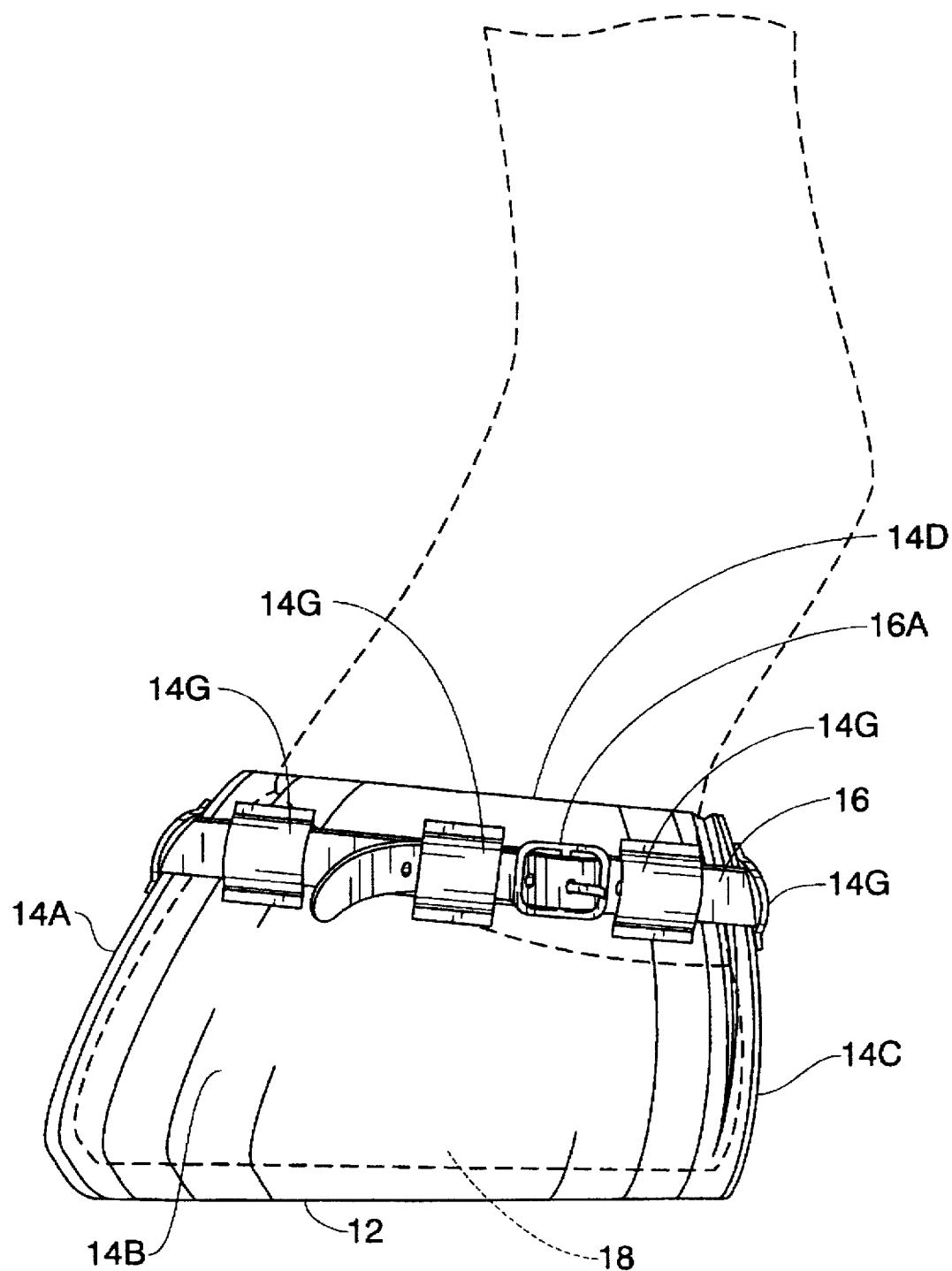
FIG. 3 is a side elevational view of the horse boot on a horse's hoof.

FIG. 3 is a side elevational view of the horse boot 10 on a horse's hoof 18. The strap 16 includes a buckle 16A for securing the strap 16 about the second panel 14, thereby securing the horse boot 10 to the horse's hoof 18.

To use the present invention, the user unbuckles and loosens the strap 16, and pulls the back portion 14C outward as shown in FIG. 2. Because the back portion 14C pivots about its connection with the first panel 12, the back portion 14C moves downward as well as outward when it is pulled, thus enlarging the opening 24 in the outward and downward directions. The horse's leg is lifted, allowing it to bend at the knee, and then the horse's hoof 18 is easily inserted into the horse boot 10 by permitting the horse's leg to pivot naturally forward and downward into the boot as the knee unbends. Because the opening 24 has been enlarged in both the outward and the downward direction at the rear of the horse boot 10, the horse's hoof 18 is easily inserted through the opening 24 into the horse boot 10.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. The scope of the invention is to be limited only by the following claims and their legal equivalents.

The invention claimed is:

1. A horse boot comprising:

a. a first panel having a perimeter and adapted to cover a bottom of a horse's hoof;

b. a second panel extending upwardly from the perimeter of the first panel and having a front portion, two opposing side portions and a back portion, the front portion adapted to cover a front of a horse's hoof, the side portions each adapted to cover a side of a horse's hoof, and the back portion adapted to cover a back of a horse's hoof;

c. the second panel forming an opening positioned opposite the first panel for insertion of a horse's hoof there-through;

d. the back portion having two sides and a triangular foldable portion at each of the sides, the foldable portions each connected to one of the side portions and configured to permit the back portion to be pulled in a direction away from the front portion and toward the first panel, the back portion pivoting about a connection between the back portion and the first panel, thereby enlarging the opening;

e. a plurality of strap guides connected to the second panel;

f. a strap configured to be inserted through the guides; and g. the strap including a fastening means for securing the strap about the second panel, thereby securing the boot to a horse's hoof.

2. A horse boot comprising:

a. a first panel having a perimeter and adapted to cover a bottom of a horse's hoof;

b. a second panel extending upwardly from the perimeter of the first panel and having a front portion, two opposing side portions and a back portion, the front portion adapted to cover a front of a horse's hoof, the side portions each adapted to cover a side of a horse's hoof, and the back portion adapted to cover a back of a horse's hoof;

c. the second panel forming an opening positioned opposite the first panel for insertion of a horse's hoof there-through;

d. the back portion having two sides and a triangular foldable portion at each of the sides, the foldable portions each connected to one of the side portions and configured to permit the back portion to be pulled in a direction away from the front portion and toward the first panel, the back portion pivoting about a connection between the back portion and the first panel, thereby enlarging the opening;

e. a plurality of strap loops distributed circumferentially about the second panel near the opening;

f. a strap configured to be inserted through the loops; and g. the strap including a buckle for securing the strap about the second panel, thereby securing the boot to a horse's hoof.

* * * * *